June 26, 1923.

E. H. LICHTENBERG 1,459,779

LOADING DEVICE

Filed June 17, 1920

Witness
E.H.Wagner

Inventor
E.H.Lichtenberg

By Robt Roberts Hill
Attorney

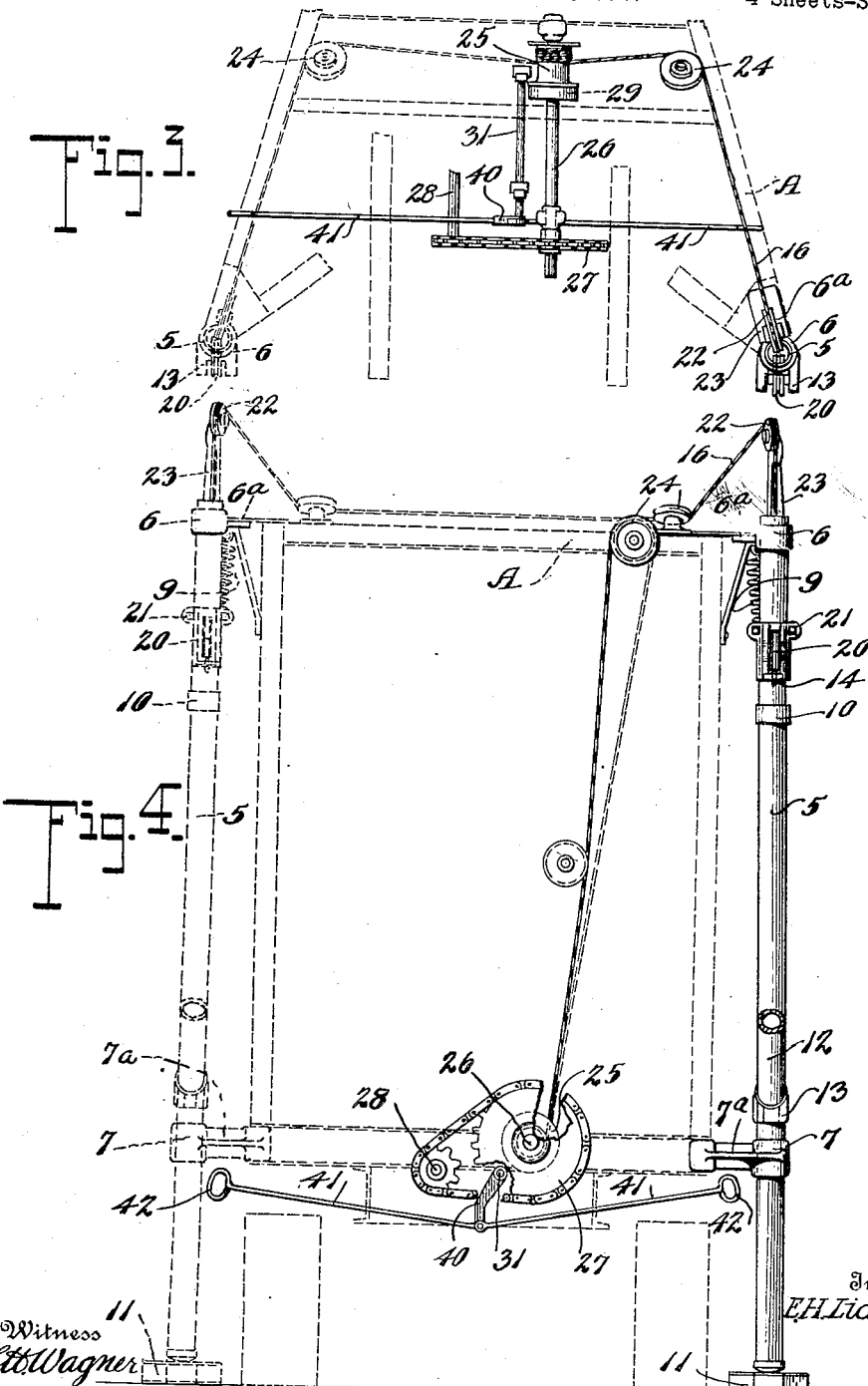

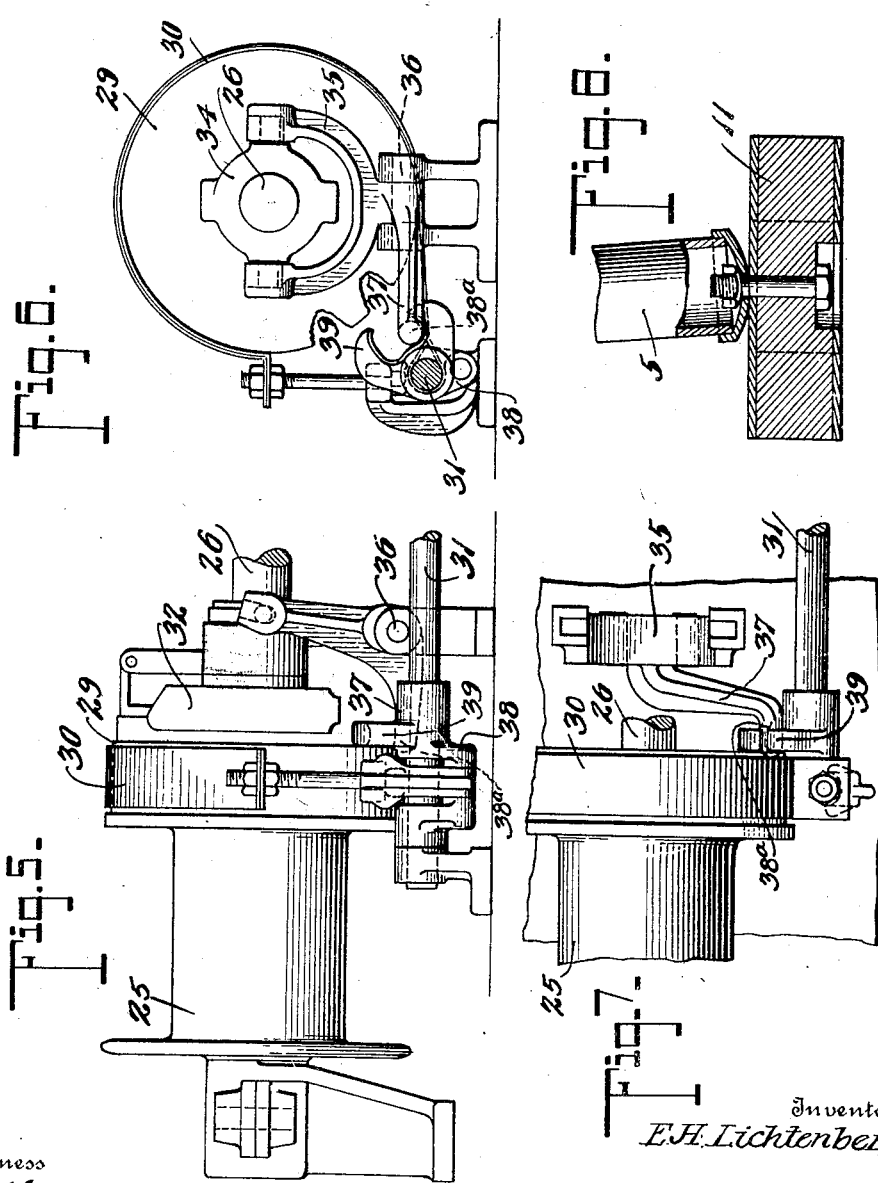

Patented June 26, 1923.

1,459,779

UNITED STATES PATENT OFFICE.

ERICH H. LICHTENBERG, OF MILWAUKEE, WISCONSIN, ASSIGNOR, BY MESNE ASSIGNMENTS, TO KOEHRING COMPANY, OF MILWAUKEE, WISCONSIN, A CORPORATION OF WISCONSIN.

LOADING DEVICE.

Application filed June 17, 1920. Serial No. 389,632.

*To all whom it may concern:*

Be it known that I, ERICH H. LICHTENBERG, citizen of the United States, residing at Milwaukee, in the county of Milwaukee and State of Wisconsin, have invented certain new and useful Improvements in Loading Devices, of which the following is a specification.

The present invention relates to a lifting crane attachment for paving machines or concrete mixers, and has for its object to provide a device of this character which embodies novel features of construction whereby the aggregate or other desired material can be supplied to the loading skip in an expeditious and economical manner.

A further object of the invention is to provide a device of this character which is normally held in an elevated position so that it will not interfere with the movement of the paver or concrete mixer as the latter is advanced, although it is automatically moved downwardly to obtain a firm bearing directly upon the ground when a load is lifted.

The invention further contemplates a lifting crane of this character which is power actuated and can be driven by the same engine that is ordinarily provided for operating the mixer and driving the truck upon which the mixing or paving mechanism is mounted.

With these and other objects in view the invention consists in certain combinations and arrangements of the parts as will more fully appear as the description proceeds, the novel features thereof being pointed out in the appended claims.

For a full understanding of the invention, reference is to be had to the following description and accompanying drawings, in which:—

Figure 2:
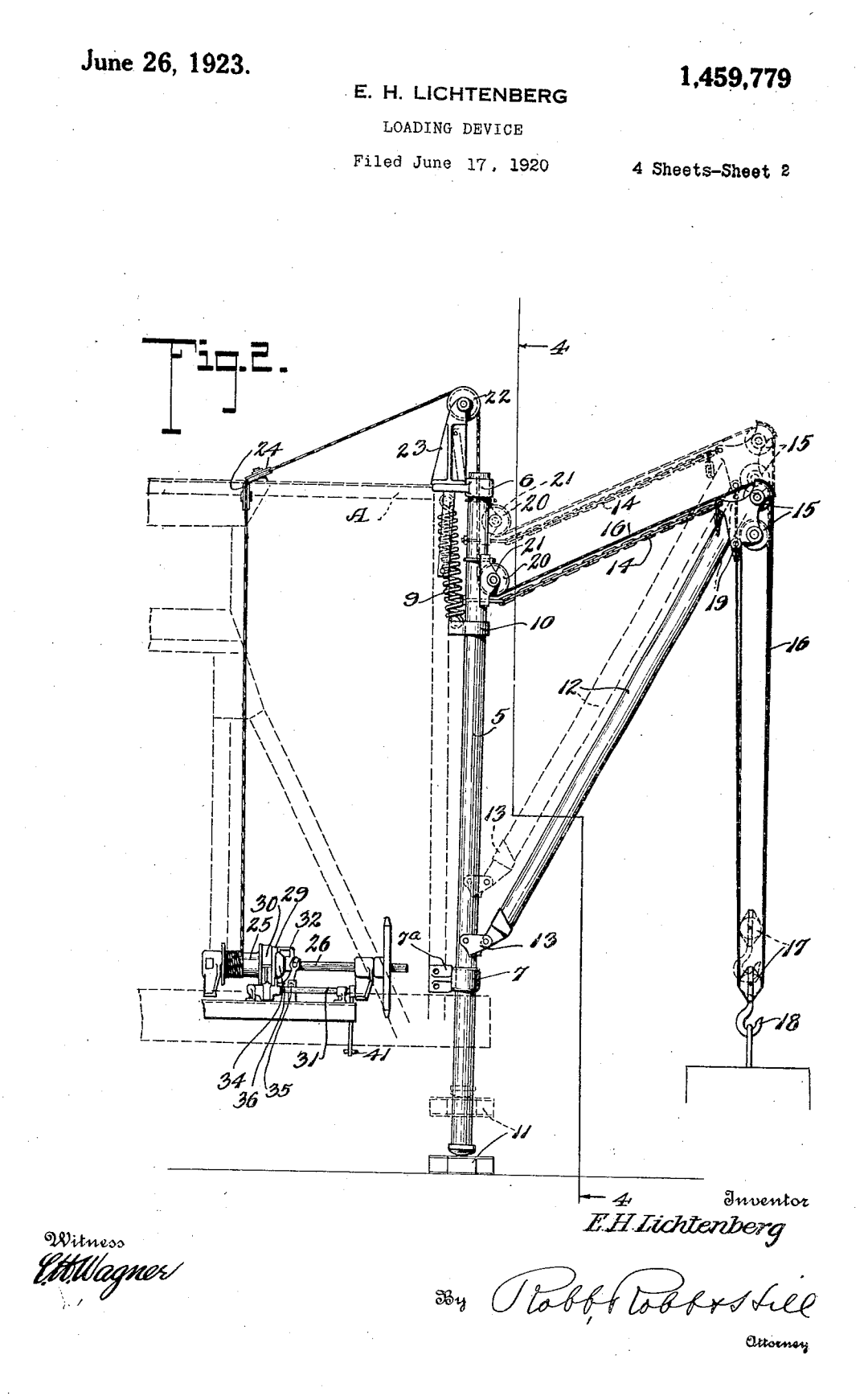

Figure 2 is a side elevation of the device, the rear end of the paving machine frame being indicated by dotted lines, the crane as shown in full lines representing the position when a load is carried thereby, while the dotted line position of the crane is the position thereof when the load is released.

Figure 3 is a top plan view of the drum and power shaft for the crane.

Figure 4 is a vertical sectional view on the line 4—4 of Figure 2, looking in the direction of the arrows.

Figures 5, 6 and 7 are detail views of the drum and clutch.

Figure 8 is a detail view of the foot at the lower end of the mast.

Corresponding and like parts are referred to in the following description and indicated in all of the views of the drawings by the same reference characters.

Figure 1:
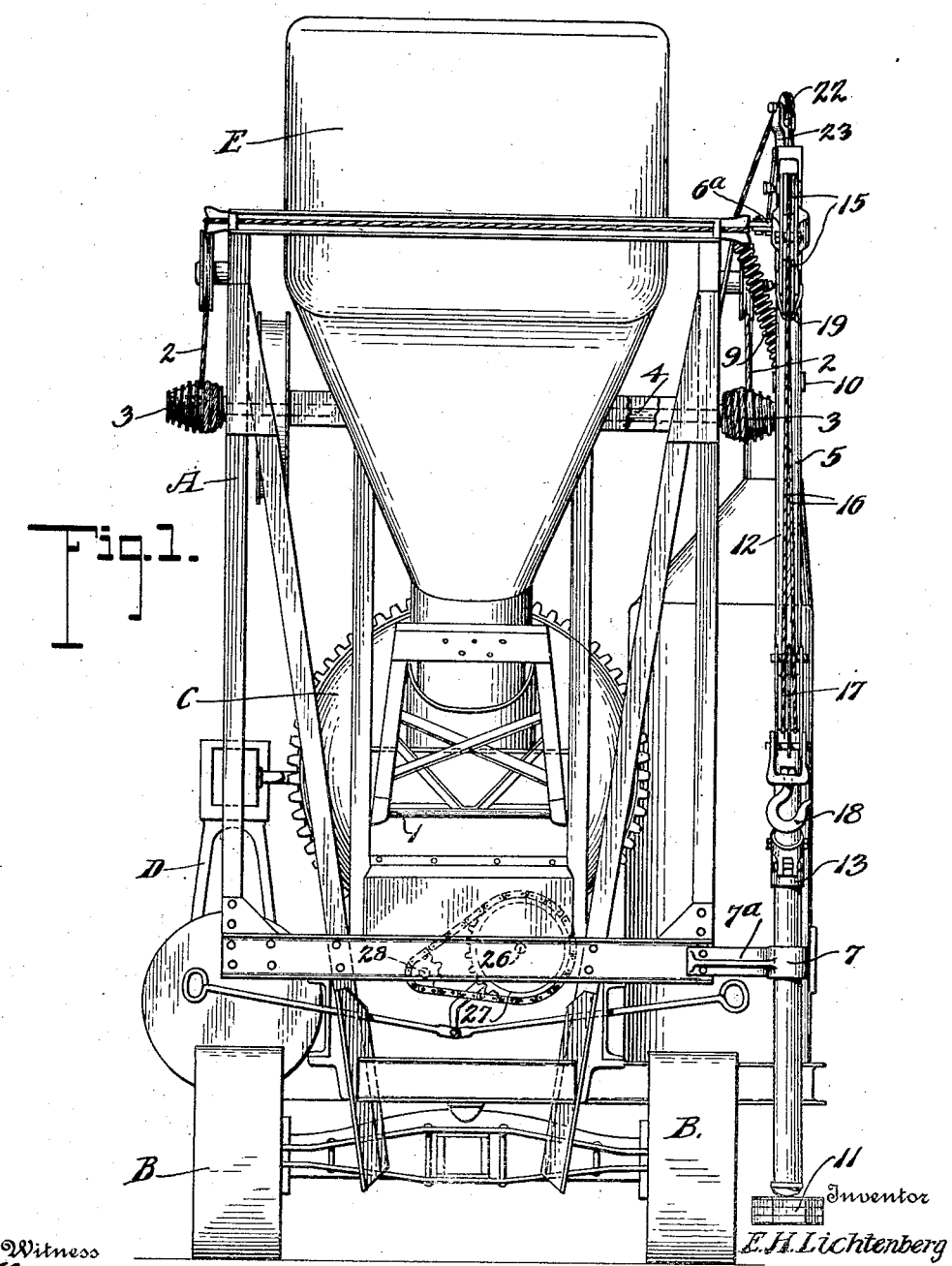
Figure 1 is a rear view of a paving machine provided with a lifting crane constructed in accordance with the invention.

The lifting crane of the present invention may be used to advantage in connection with any portable paving machine or concrete mixer which is of a sufficient capacity to necessitate the handling of the aggregate and materials by power, and it will be found especially useful in connection with road building machines of the type disclosed by Reissue Patent No. 13,617 granted September 16, 1913, and Patent No. 1,141,470 granted June 1, 1915. It is immaterial, however, whether the concrete distributing means is of the boom and bucket type or of the chute type. Paving machines of this general type are adapted to be used in connection with narrow gage railways on which the aggregate materials such as sand and gravel are carried to the paver by what are known as hopper cars. The crane attachment contemplated by this invention is mounted upon the paving machine which virtually comprises a portable concrete mixing and distributing plant, said crane being utilized to lift the loaded hoppers of the cars (known as "batch boxes") and swing them over the loading skip or bucket of the paver, preparatory to dumping the hoppers into the loading skip, after which the hoppers are swung back into position over the car trucks and again deposited thereon. The skip will charge the materials into the drum of the concrete mixer in the well known manner.

Referring to the drawings, which illustrate one possible embodiment of the invention, the reference character A designates the skeleton supporting frame of a paving machine, said frame being mounted upon a truck B so that it can be readily moved from place to place and advanced step by step as the paving operation proceeds. A conventional concrete mixer C is mounted upon the frame A, and an engine D is provided for driving the mixer and other parts of the paving machine. A loading skip E of a well known type is provided for charging the materials and aggregate into the drum of the mixer. This loading skip is pivoted at 1 to swing up and down, and cables 2 connect the loading skip to drums 3 on a transverse shaft which is journalled upon the top of the frame A. This shaft 4 has a suitable connection with the engine D so that it can be driven thereby to raise the skip when it is desired to charge the materials previously deposited upon the skip into the drum of the mixer C. This is all of a conventional and well known construction and no claim to novelty is based thereon as to general construction, though the specific drum construction is new.

The lifting crane is arranged adjacent to the loading skip and may be mounted upon either side of the paving machine as desired. The mast 5 of the lifting crane is slidably mounted within an upper guide sleeve 6 and a lower guide sleeve 7, said guide sleeves being carried by brackets 6ª and 7ª which project laterally from the main frame of the paving machine. The mast 5 is both slidably and rotatably mounted within the guide sleeves 6 and 7, and is normally held in an elevated position by a tension spring 9, said spring being shown as having the upper end thereof connected to the bracket 6ª, while the lower end thereof is connected to a collar 10 on the mast. The lower end of the mast is provided with a foot 11 which is normally elevated above the surface of the ground, although when a load is imposed upon the crane the mast automatically slides downwardly against the action of the spring 9 until the foot 11 thereof rests upon the ground and obtains a direct bearing thereon for the support of the load. The foot is loosely connected to the mast so that it has a limited swinging movement in all directions and can accommodate itself to the surface of the ground when it is lowered into engagement therewith.

The mast 5 carries a boom 12 which is pivotally connected to a bracket 13 on the mast. A suitable tie member such as the chain 14 connects the outer end of the boom to the upper end of the mast and limits the outward swinging movement of the boom. The outer end of the boom is provided with pulleys 15 around which the hoisting cable 16 is passed, said cable also passing around the sheaves of a block 17 carrying the hoisting hook 18, and having one end thereof secured at 19 to the boom. The opposite end of the cable extends inwardly from the outer end of the boom to a pulley 20 which is journalled within bearings 21 carried by the mast. The mast preferably has a tubular formation, and after passing around the pulley 20 the cable 16 extends upwardly through the interior of the mast to a pulley 22 which is arranged above the upper end of the mast and journalled upon a bracket 23. From this pulley 22 the hoisting cable passes around guide pulleys 24 and is carried downwardly to a drum 25 which is loose on a shaft 26. A chain and sprocket 27 connects the shaft 26 with a drive shaft 28 which has an operative connection with the engine, thereby providing for constantly rotating the shaft 26 when the paver is in operation.

One end of the drum 25 is provided with a brake drum 29 which is engaged by a brake band 30, said brake band having an operative connection with a control shaft 31 which has a spaced and parallel relation to the shaft 26 of the drum. A clutch connection 32 is provided between the drum 25 and the shaft 26. This clutch connection may be of any conventional construction, although it is shown as including a head 34 which is slidable longitudinally on the shaft 26, being actuated by a fork 35 which is pivoted at 36. The axis of the fork is at right angles to the shafts 26 and 31, and the pivot end of the fork is formed with a lateral arm 37 which is curved to one side and terminates in a finger 38ª projecting within a yoke 39 on the shaft 31. The shaft is thus enabled to have a limited rocking movement independent of the shifting fork of the clutch, although this fork will be moved to actuate the clutch upon a continued rotation of the shaft 31 after one of the arms of the yoke 39 has been brought into engagement with the finger 38ª. The brake and clutch are connected to the shaft in such a manner that when the shaft is rocked in one direction the brake band will be loosened and the clutch closed, while when the shaft is rocked in the other direction the brake band will be tightened and the clutch opened. An operating arm 40 is rigid with the shaft 31 and has the free end thereof connected to rods 41 which extend laterally to opposite sides of the machine where they terminate in the handles 42. With this construction it will be obvious that the brake and clutch mechanisms which control the operation of the lifting crane can be readily manipulated by an operator positioned on either side of the paver.

The guide sleeves 6 and 7 are not in vertical alinement and the mast 5 of the crane is thus held at a slight inclination to the vertical so that after the loaded hopper or bucket known as a "batch box" has been lifted from the car or wagon truck by the crane it will automatically swing by gravity into a position over the loading skip E. The contents of the hopper or bucket can then be dumped into the skip and the boom of the crane swung by manual means or otherwise back to its original position to bring the empty hopper or bucket back over the car or wagon truck. This gravity swinging of the crane when loaded into proper position for discharging its load provides a quick and effective means for supplying the loading skip with aggregate or other materials and enables the mixer to be kept in substantially continuous operation without confusion and delay.

The mast of the frame is raised by the action of the spring 9 so as to keep the foot 11 elevated above the surface of the ground at all times except when a load is actually carried by the crane. This avoids the possibility of the foot and mast being damaged or broken by a movement of the truck B of the paving machine while the foot is in engagement with the ground. The construction also has the advantage of enabling the crane to obtain a firm bearing upon the ground when a load is supported thereby and this avoids the lateral thrusts and strains which would otherwise be imposed upon the main frame of the machine. The mast when grounded will also assist in bracing the frame of the machine.

When the paving machine is to be moved for any appreciable distance the cable of the block and tackle device may be utilized to swing the boom inwardly against the mast and raise the mast considerably more than it is ordinarily necessarily raised by the spring. When the drum 25 is rotated to wind up the cable 16, it will be obvious that after the block 17 is brought into engagement with the pulleys at the end of the boom 12, a further rotation of the drum will swing the boom inwardly toward the mast 5 and pull upwardly upon the mast to lock the same in an elevated position. There will thus be no possibility of the mast being accidentally moved downwardly into engagement with the ground by the vibration of the paving machine as it is being moved from place to place. This positive locking of the mast in an elevated position by winding up as much of the cable 16 on the drum 25 as is possible, is ordinarily not necessary when making a slight advance of the machine, although when the machine is to be moved any appreciable distance this is advisable, since it absolutely prevents any injury to the mast or mountings therefor which would result if the lower end of the mast should come into engagement with the ground while the machine was in motion. Ordinarily the arrangement is such that the spring elevates the mast two or three inches from the ground, although when the cable is tightened the mast is lifted a greater distance, for instance ten inches, and held securely at this elevation so that there is no possibility of the vibration of the machine throwing the mast downwardly against the ground, even when the paver is traveling on very rough ground.

It may be noted in regard to the operation of the loading skip E that the cable 2 which winds upon the drums 3 of the shaft 4 has imparted thereto variable speed in the elevation of the loading skip owing to the special formation of said drums 3. In other words, the drums 3 are of larger diameters at the middle portions than at the ends toward which they have a tapered formation. The cable is compelled to wind upon the drums in a predetermined manner owing to the grooving of said drums.

In Figure 1 the cable 2 is illustrated as wound upon the inner tapered ends of the drums 3, this being the arrangement when the skip E is hoisted to its uppermost position. As the skip lowers to its normal position the cable unwinds toward the outer tapered ends of the drum. This construction is of special advantage because as the skip E is caused to commence its upward movement in loaded condition through the operation of the engine and driving connections with the shaft 4, the power is transmitted to the elevated cable 2 with a maximum driving action and at a relatively slow speed, this being desirable because of the weight of the skip E and the load. As the skip approaches a position in which the weight of the load is beginning to be carried by the pivot means at 1, it is desirable that the speed of movement of the skip be increased until the skip approaches its uppermost position, and this is caused by the increasing diameter of the middle portion of the drums 3. As the skip E approaches its final charging elevation it is further desirable that the speed of its movement be reduced and this is accomplished in the operation of the cable 2 through the innermost tapered formations of the drums 3, in self-evident manner. Therefore, while it has been heretofore proposed in a general way to use operating drums to lift a skip like the skip E, and its load, it is to be understood that I am not aware that the specific type of mechanism above described has ever heretofore been proposed.

While I have described one particular embodiment of the invention, it will be understood that many modifications and changes can be made in the details of construction without departing from the spirit of the invention.

Having thus described the invention, what I claim as new and desire to secure by Letters Patent is:—

1. In a lifting crane of the character described, the combination with a movably mounted supporting frame, of a mast slidably mounted thereon and adapted to engage the ground when in a lowered position, means for holding the mast in an elevated position operable automatically to permit the mast to engage the ground when a load is imposed thereon, and batch box engaging means associated with the mast.

2. In a lifting crane of the character described, the combination with a movably mounted supporting frame, a mast slidably mounted thereon, yielding means normally holding the mast in an elevated position, a foot applied to the mast and adapted to rest upon the ground when the mast is lowered, and hoisting means associated with the mast.

3. In a lifting crane of the character described, the combination with a movably mounted supporting frame, superposed guides thereon, a mast slidably and rotatably mounted within the guides, means for normally holding the mast in an elevated position, said mast being mounted freely in the guides to slide downwardly into engagement with the ground when a load is imposed thereon, a boom carried by the mast, and hoisting means associated with the boom and mast.

4. In a lifting crane of the character described, the combination with a movably mounted supporting frame, superposed guides carried by the frame and arranged out of vertical alinement, a shaft slidably and rotatably mounted within the guides, yielding means normally tending to elevate the mast, a foot upon the mast adapted to engage the ground when the mast is lowered by a load thereon, a boom carried by the mast, and hoisting means associated with the mast and boom, the mast and boom being arranged at an inclination to the vertical so that when there is a load upon the boom it will swing laterally by the action gravity.

5. In a lifting crane of the character described, the combination with a truck supported frame, of a constantly rotating drive shaft upon the frame, a drum associated with the drive shaft, a clutch connection between the drum and drive shaft, a brake for the drum, means for simultaneously controlling the brake and the clutch, a vertically movable mast mounted upon the frame, and hoisting means associated with the mast for holding it elevated and including a cable connected to the drum.

6. In a lifting crane of the character described, the combination with a truck supported main frame, of an upright mast slidably and rotatably mounted thereon and arranged at an inclination to the vertical, yielding means normally tending to elevate the mast, a foot applied to the mast for engagement with the ground when the mast is lowered by a load thereon, a boom carried by the mast, and hoisting means associated with the boom and mast, the inclination of the mast causing the boom to swing laterally when there is a load thereon.

7. In a lifting crane of the character described, the combination with a supporting frame, an upright mast mounted thereon to have a limited up and down movement, yielding means normally holding the mast in elevated position and raising it after downward movement, a foot applied to the mast and adapted to rest upon the ground when the mast is lowered, and hoisting means associated with the mast and arranged to positively elevate the mast under certain conditions substantially as described.

8. In a lifting crane of the character described, the combination with a supporting frame, a mast mounted thereon to have a limited up and down movement, a foot applied to the mast and adapted to rest upon the ground when the mast is lowered, a boom carried by the mast, and hoisting means associated with the boom and mast and arranged to swing the boom toward the mast and positively elevate the mast under certain conditions substantially as described.

9. In a lifting crane of the character described, the combination with a supporting frame, a mast mounted thereon to have a limited up and down movement, yielding means normally holding the mast in an elevated position, a foot applied to the mast and adapted to rest upon the ground when the mast is lowered, a guide member on the mast, a guide member above the mast, and hoisting means associated with the mast and including a cable which extends around the said guide members so that the cable may be utilized to lock the mast in an elevated position.

10. In a lifting crane of the character described, the combination with a supporting frame, a mast mounted to have a limited up and down movement thereon, yielding means normally holding the mast in an elevated position, a foot applied to the mast and adapted to rest upon the ground when the mast is lowered, a boom carried by the mast, a guide member on the boom, a second guide member on the mast, a third guide member above the mast, and a block and tackle associated with the boom and mast, the cable thereof passing around the three before-mentioned guide members so that it can be utilized to swing the boom toward the mast and lock the mast in an elevated position.

11. In a lifting crane of the character described, the combination with a supporting frame, of a mast mounted thereon to have a limited up and down movement and adapted to obtain a bearing directly upon the ground when it is lowered, and hoisting means associated with the mast and arranged to be used to elevate the mast under certain conditions substantially as described when there is no load thereon.

12. In a lifting crane of the character described, the combination with a supporting frame, of an upright mast slidably and rotatably mounted thereon and adapted to obtain a bearing upon the ground when moved downwardly, a boom carried by the mast, and hoisting means associated with the boom and mast and arranged to positively elevate the mast and swing the boom inwardly against the same under certain conditions substantially as described when there is no load thereon.

13. A lifting crane of the character described including a vertically movable mast and hoisting means carried thereby, said mast being normally elevated, and means whereby the mast may be automatically grounded when a load is imposed thereon.

14. A lifting crane of the character described including a vertically movable mast, yielding means normally holding the mast in an elevated position, hoisting means carried by the mast, and means whereby the mast may be automatically grounded when a load is imposed thereon.

15. A lifting crane of the character described including a vertically movable mast, yielding means normally holding the mast in an elevated position, and hoisting means carried by the mast, the mast being automatically grounded when a load is imposed thereon and the hoisting means being arranged for use to positively elevate the mast under certain conditions substantially as described when there is no load thereon.

16. A lifting crane of the character described including a rotatably mounted mast, a boom thereon to swing laterally hoisting means connected with the boom, said mast being arranged at an inclination to the vertical so that it will automatically turn by gravity when a load is imposed thereon by the hoisting means, and means to operate the hoisting means to impose a load on the boom and mast.

17. In a lifting crane of the character described, the combination with a frame provided with a loading skip, of a rotatably mounted mast, a swinging boom thereon, and hoisting means carried by the mast and boom and projecting laterally therefrom to coact with the boom, said mast being inclined to the vertical so that it will automatically turn by gravity and swing a load imposed thereon over the loading skip, and means to operate the hoisting means to impose a load on the mast and boom.

18. A lifting crane of the character described including a mast mounted to rotate and slide up and down, yielding means normally tending to elevate the mast, and hoisting means carried by the mast and projecting laterally therefrom, said mast being automatically grounded when a load is imposed thereon and being arranged at an inclination to the vertical so that it will automatically turn by gravity when loaded.

19. In a lifting crane of the character described, the combination with a supporting frame, a mast mounted thereon to have a limited up and down movement, a foot applied to the mast and adapted to rest upon the ground when the mast is lowered, a guide member on the mast, a guide member above the mast, and hoisting means associated with the mast and including a cable which extends around the said guide members so that the cable may be utilized to lock the mast in an elevated position.

In testimony whereof I affix my signature.

ERICH H. LICHTENBERG.